Figure 1:
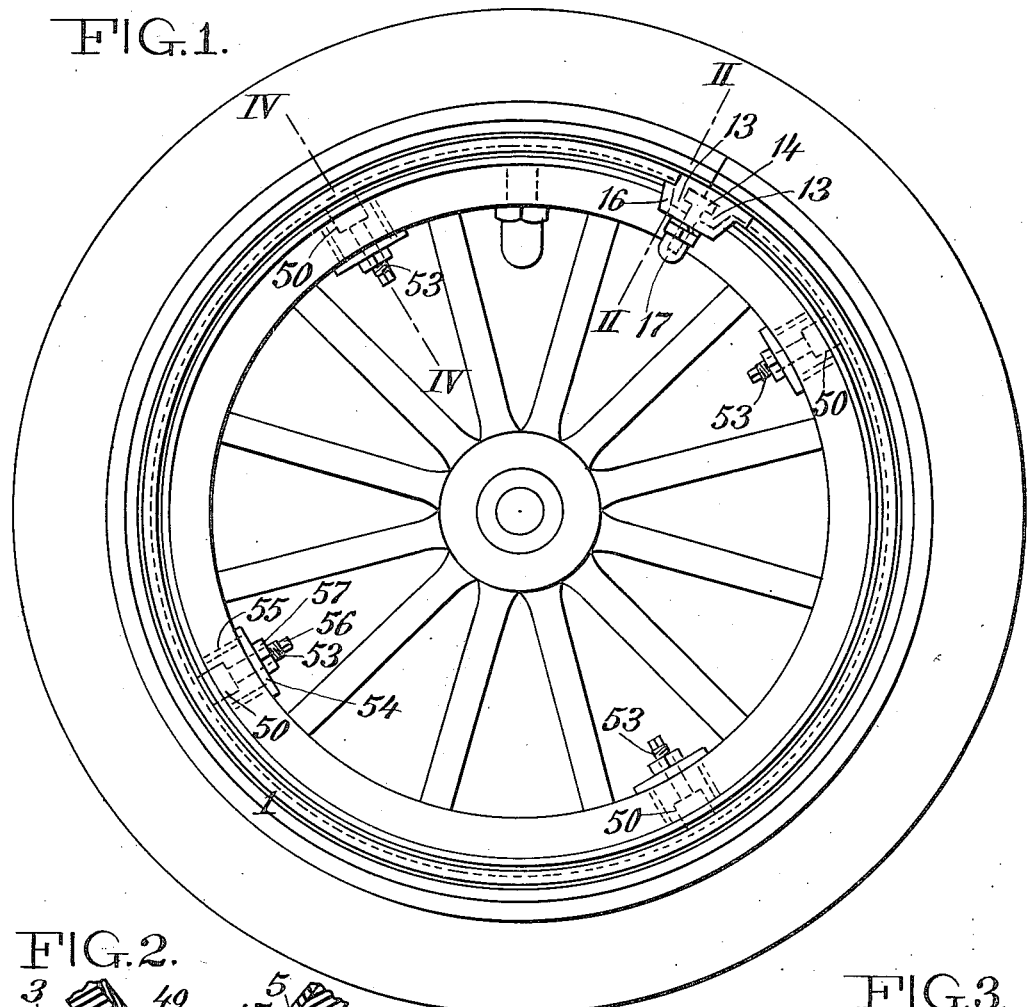

J. H. WAGENHORST.
VEHICLE WHEEL RIM.
APPLICATION FILED JUNE 10, 1912.

1,160,225.

Patented Nov. 16, 1915.
2 SHEETS—SHEET 1.

Witnesses:
Karl S. Dietz
Edmund Quincy Moses

Inventor
James H. Wagenhorst
By his Attorney
Seward Davis

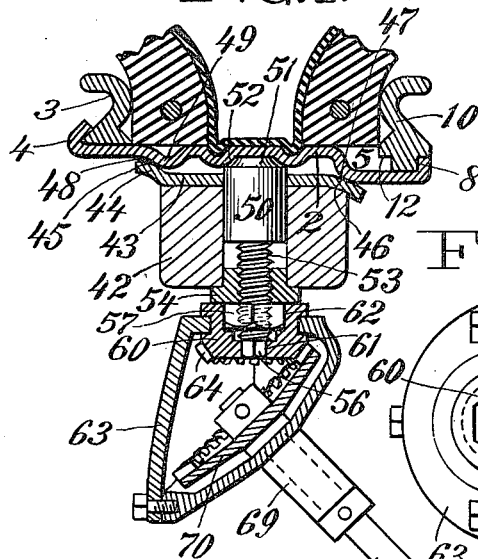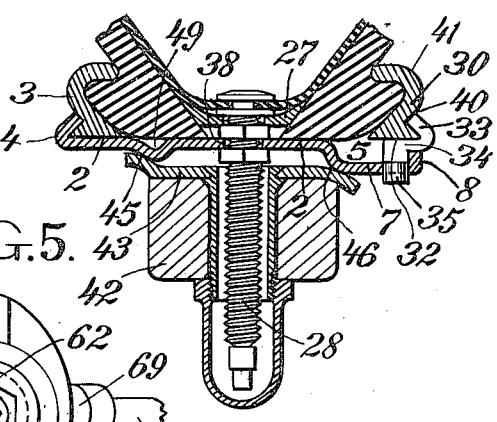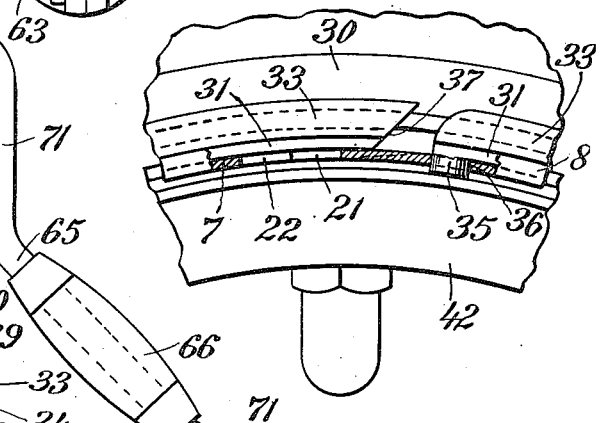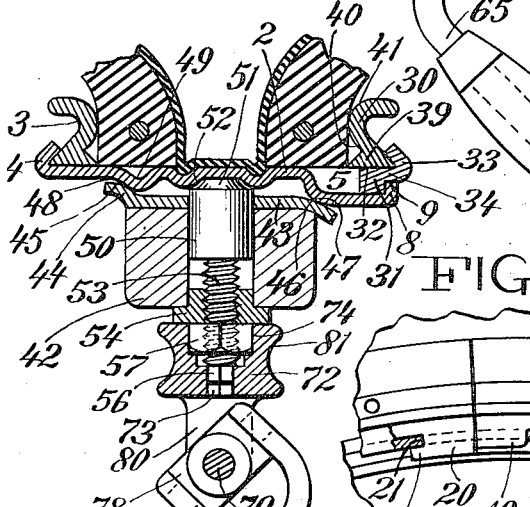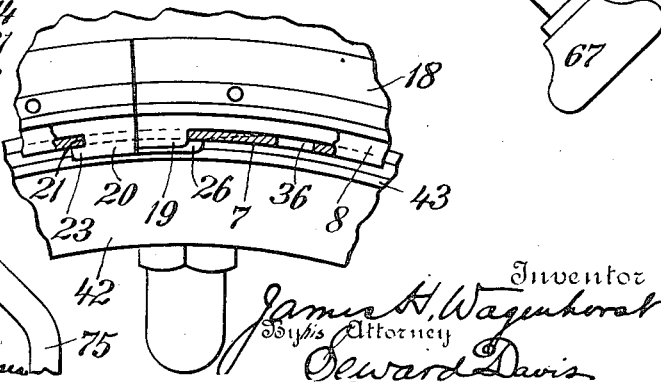

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,160,225.

Specification of Letters Patent. Patented Nov. 16, 1915.

Application filed June 10, 1912. Serial No. 702,856.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in vehicle rims of the class designed to carry pneumatic or other resilient tires. Rims for this purpose usually comprise a channel adapted to be secured either permanently or removably upon a vehicle wheel, the base of the resilient tire being received in this channel and held upon the wheel by the flanges thereof. In one well-known class of rims of this kind one of the flanges of the rim has been made removable in order to facilitate the application of the tire to the rim and its removal therefrom, the removal of the flange making it unnecessary to stretch the tire over the same. With this kind of a rim it is also possible to use a tire having inextensible selvages, such tires requiring no security bolts to retain them in position and having accordingly come to be known in the trade as " quick-detachable " tires. Rims provided with removable flanges and adapted to receive such tires are commonly known in the trade as " quick-detachable " or simply " Q-D " rims. In one well-known type of rim of this kind an endless removable flange has been used, the flange being locked to the rim base or main tire-carrying portion of the rim by means of a transversely split spring-locking ring, the rim base being provided with a channel at one side thereof to receive this locking ring. In another well-known type of " quick-detachable " rim a transversely split removable tire-retaining flange has been used, the flange having a base portion fitting in a channel formed at the side of the rim base, some means being used for holding the ends of the split ring together so as to retain the ring in position. In this type of rim no separate locking ring is used. Each of these types of rim possesses certain advantages which the other does not possess, and as a consequence some automobile makers and rim users have preferred one form of rim and some the other. As these rims have heretofore been constructed, it has been necessary to provide rim bases with different shaped channels therein for the two kinds of rims, and rim makers have therefore had to roll two distinct shapes for the two rims and have also had to keep in stock complete sets of parts, including rim bases, for each kind of rim. It has also been necessary for rim dealers to carry two complete types of rim. By my present invention I have devised a rim in which the same rim base or main tire-carrying portion can be used with either type of rim, the channel at the side of the rim base being so shaped as to receive either a transversely split tire-retaining flange or a transversely split locking ring adapted to hold an endless tire-retaining flange in position. With my improved form of rim only one shape of rim base need be rolled or carried in stock by either the rim maker or dealer. All that is necessary for either the manufacturer or dealer to handle is a stock of rim bases of one shape and the necessary transversely split flanges and endless flanges and locking rings to equip such rim bases for either of the desired types of rim. A great saving is thus effected as the rim base is by far the most bulky and costly part of the rim.

The nature of my improvements by which I attain the above objects will fully appear from the following detailed description. I have also shown in the drawings and will describe certain improvements in demountable rim construction and certain improved tools for operating demountable rims.

Figure 2:
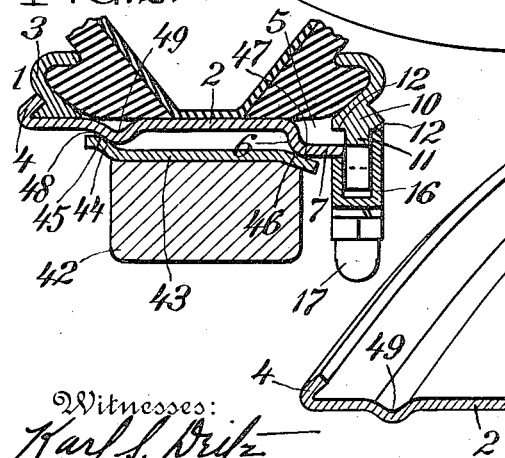
Figure 3:
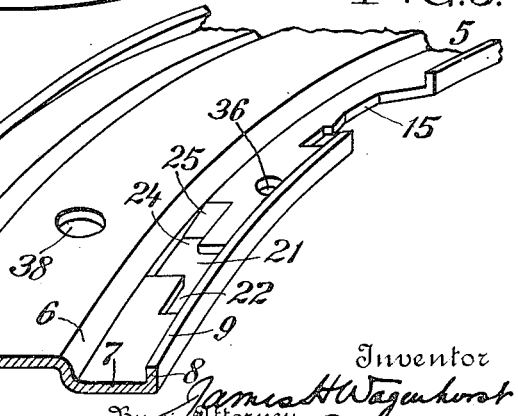

In the accompanying drawings which form a part of this specification, Figure 1 is a side elevation of a vehicle wheel having one form of my improved rim mounted thereon; Fig. 2 is a transverse section on line II—II of Fig. 1; Fig. 3 is a perspective view of a portion of a rim base of my improved form; Fig. 4 is a section on line IV—IV of Fig. 1, the flanges of the rim being shown in reversed position so as to retain a straight-sided tire instead of a clencher tire, this figure also illustrating an improved form of tool for operating the radial studs by which the rim is secured upon the wheel; Fig. 5 is an end view of the head of the tool shown in Fig. 4; Fig. 6 is a transverse section through a wheel felly, rim, and the base of the tire taken at the valve-stem, the rim base being shown as equipped with an endless removable tire-retaining flange held in position by my improved transversely split locking ring, this endless flange and locking ring being substituted for the transversely split tire-retaining flange shown in Figs. 1, 2 and 4; Fig. 7 is a side elevation of the parts shown in Fig. 6, a portion of the outer wall of the channel of the rim base being broken away; Fig. 8 is a view similar to Fig. 6, the section being taken at one of the radial studs and the endless tire-retaining flanges being shown reversed to engage a straight-sided tire instead of a clencher tire, this figure also showing a portion of another form of tool for operating the radial studs; Fig. 9 is a view similar to Fig. 7, but showing the endless removable tire-retaining flange and transversely split locking ring replaced by a form of transversely split tire-retaining flange having lugs at its ends interlocking in a slot in the rim base.

Referring to the drawings in detail, the numeral 1 designates a tire-carrying rim adapted to receive a pneumatic tire. This rim consists essentially of a base or tire-seating portion 2 having tire-retaining flanges at each side thereof, one of which flanges may be removed so as to permit the removal of the tire from the rim base or its application thereto without stretching the beads of the tire over the flange. The other flange of the rim may or may not be removable. Such second flange may, for example, be integral with the rim base. I prefer, however, to provide a reversible tire-retaining flange 3 retained upon the rim base by an inwardly hooked flange 4 formed integral with the rim base. The flange 3 can be removed only after the tire-retaining flange at the other side of the rim base and the tire have been taken off, and it is made removable only so that it can be reversed to adapt the rim to receive a different type of tire. Thus I have shown the flange 3 in Fig. 2 placed upon the rim base with the side containing the clencher groove toward the tire, so as to receive a clencher tire, while in Fig. 4 I have shown this flange reversed so as to enable a straight-sided tire to be mounted upon the rim. At the opposite side of the rim base from that provided with the flange 4, I form a channel 5 preferably by rolling a depression in the metal without thickening the same, as this is much the cheapest way to form such a channel and also produce a strong and light structure. The channel may, however, be formed in any other desired manner. The channel comprises an inner wall 6, a bottom 7, and an outer wall 8, the edge 9 of the wall 8 being preferably of smaller diameter than that of the tire-seating surface of the rim base, as clearly shown in the drawings. In Figs. 1, 2 and 4 I have shown mounted in the channel 5 a transversely split reversible tire-retaining flange 10. The form of flange shown in these figures comprises an upper part or retaining flange proper having in one side a clencher groove adapted to receive the bead of the clencher tire, the other side being shaped to engage a straight-sided tire. The flange is shown in its two positions in Figs. 2 and 4, respectively. This upper part of the flange is mounted upon a base 11 adapted to be received in the channel 5 and to engage the outer wall 8 thereof, such engagement holding the flange against lateral movement. The flange is preferably provided with the shoulders 12, one of which is adapted to seat upon the edge 9 of the outer wall 8 of the channel. The means for securing the ends of this split removable flange together may be of various forms; for example, in Figs. 1 and 2 I have shown the ends of the flange provided with lugs 13 having their adjacent faces under-cut so as to provide a recess for the T-shaped head of a bolt 14. The lugs 13 are received in a notch or slot 15 of the form shown in Fig. 3, they being retained in position by means of a cap 16 which slips over the lugs and is wedged upon the lugs by means of a nut 17 screwing on the threaded stem of the bolt 14. This form of locking device is fully described in the patent to Bryant, Number 912,537, dated February 16, 1909. I do not wish to limit myself, however, to this form of locking device, as the transversely split flange may be secured in position in other ways; for example, the flange may be provided with lugs adapted to interlock with a slot in the rim base in the manner described in the patent to Shaw, No. 926,296, dated June 29, 1909. A flange having lugs of this type is shown applied to a rim in Fig. 9. In this figure 18 is the transversely split tire-retaining flange having at its ends the lugs 19 and 20. These lugs are received in the slot 21, the form of which is clearly illustrated in Fig. 3. This slot has a longitudinally offset portion 22 near the outer wall of the channel which receives the lug 20, the latter having an extension 23 thereon which hooks beneath the bottom of the channel and holds the end of the flange carrying the lug 20 against radial movement. The slot 21 has another offset portion 24 out of alinement with the portion 22, the end of this portion of the slot being preferably beveled as indicated at 25. The lug 19 is guided by the beveled wall 25 into the offset portion 24 of the channel so as to bring the extension 26 of the lug under the bottom of the channel as shown in Fig. 9. The lugs are then locked in the portion of the slot 21 nearest the outer wall of the channel, the lugs and consequently the flange being locked against circumferential movement and the ends of the flange being held against radial movement. The unlocking of the flange is accomplished by moving the end of the same carrying the lug 19 away from the outer wall of the channel, which permits the lug 19 to be lifted out of the slot through the portion 24 thereof. The end of the rim is normally held against such lateral movement by the inflated tire upon the rim, the pressure of the inflated tire being supplemented, if necessary, by the pressure of the usual clip 27 carried on the end of the valve-stem 28 as shown in Fig. 6. This clip serves to hold a bead of the tire pressed against the flange 18 and thus positively locking the ends of the flange against lateral movement even though the tire become deflated.

As will be obvious, the rim base may have formed therein either the slot 15 or the slot 21, as above described, although I may form in the rim base slots of both of said shapes as shown in Fig. 3. If this is done the same rim base may be provided with either the flange of the type shown in Figs. 1 and 2 or the flange of the type shown in Fig. 9. If the flange of the type shown in Fig. 9 is used, the channel 5 must be sufficiently wide to permit the end of the flange to be moved laterally so that the lug 19 may be inserted into or removed from the offset portion 24 of the slot 21. I have shown the channel 5 wide enough to admit of this operation. The channel need not have this extra width if only the form of transversely split flange shown in Figs. 1 and 2 is to be used, although the width of the channel is no objection. In fact, I may make use of the extra width of the channel to provide a supporting surface for the rim upon the wheel, as will be hereinafter described.

In Figs. 6, 7 and 8 I have shown the rim base of the form shown in Figs. 1, 2, 3, 4 and 9, provided with an endless removable tire-retaining flange held in position by a transversely split locking ring instead of with a transversely split tire-retaining flange. As shown in these Figs. 6, 7 and 8, 30 is the endless tire-retaining flange which is preferable reversible and may advantageously be made of the same section as the flange 3 at the other side of the rim. Fig. 6 shows the flange 30 engaging a clencher tire, while Fig. 8 shows it reversed and engaging a straight-sided tire. 31 is the transversely split locking ring for retaining the flange 30 upon the rim base. The ring 31 has a body portion seating in the channel 5, the flange 30 seating upon the cylindrical bearing surface 32 of this ring. The ring 31 is provided with a flange 33 which extends up outside of the tire-retaining flange 30 and holds the latter against outward movement. By making the edge 9 of the outer wall 8 of the channel 5 of less diameter than that of the tire-seating surface of the rim base, as above described, it will be seen that a space is left between the under-surface of the flange 30 and the edge 9, the under-surface of the flange 30 preferably being of the same diameter as that of the tire-seating surface of the rim. This arrangement permits the flange 33 to be carried upon an extension 34 of the locking ring, such extension passing between the edge 9 and the under-surface of the flange 30 and being supported by such edge. It is thus possible to carry the flange 30 out over the edge of the wall 8 and to bring the tire-engaging portion of the flange 30 into the same location as the corresponding tire-engaging portion of the flange 10 when the latter is used upon the rim base, thus insuring a proper width of the rim channel to receive the tire. One end of the locking ring 31 is preferably provided with a pin 35 adapted to be received in a hole 36 formed in the bottom 7 of the channel 5 for the purpose of preventing creeping of the locking ring and to hold the end of the same stationary so as to facilitate its application. The other end of the locking ring may be beveled or undercut as indicated at 37, so as to permit a tool to be inserted under said end for the purpose of prying the ring out of its seat. The flange 30 is secured in position by placing it against the side of the tire upon the rim, pressing the beads of the tire together slightly, so as to permit the flange 30 to be moved inward beyond its normal position, and then springing the locking ring 31 over the wall 8 of the channel 5 and seating it in such channel. The flange 30 is then moved laterally outward over the locking ring until it seats upon the seat 32 of the latter and is held against further outward lateral movement by its engagement with the flange 33. The tire-retaining flange 30 being endless, now positively locks the transversely split locking ring 31 against radial outward movement and thus prevents such locking ring from coming out of the channel 5. The flange 30 is removed by reversing the above operations; that is, it is first moved laterally inward, the end of the tool is then inserted under the beveled end 37 of the locking ring and the locking ring sprung out of the channel 5. The flange 30 and the tire are then free to be taken off. The inflated tire normally prevents the flange 30 from moving inward so as to disengage the locking ring 31, the valve clip 27 preventing the flange from moving inward and releasing the locking ring, even though the tire becomes deflated. In order that the valve clip may be used both to prevent the inward movement of the endless flange 30 and the consequent release of the locking ring 31, and to prevent the unlocking of the lugs on the ends of the tranversely split flange 18, when the latter are used, the slot 21 for the lugs 19 and 20 and the hole 36 for the pin 35 are preferably located near the hole 38 for the valve-stem 28, as shown in Fig. 3. The valve clip will thus be located approximately opposite to either the adjacent ends of the split flange 18 or the ends of the locking ring 31, whichever may be used with the rim base. If the flange 30 is of the form shown, having the dovetail-shaped base 39, one inclined wall of which is formed by the toe of the side of the flange containing the clencher groove, while the other inclined wall is formed by rolling a groove 40 in the side of the flange designed to engage a straight-sided tire below the curved surface 41 adapted to engage such tire, the flange 33 of the locking ring 31 which engages the base of the tire-retaining flange is preferably inwardly hooked as shown.

The tire-carrying rim above described may be permanently mounted upon a vehicle wheel in any suitable manner; for example, by being shrunk directly upon the wooden felly thereof, or it may be removably secured to the vehicle wheel in any suitable manner, thus providing a demountable rim structure. I have illustrated in the drawings one mode of removably securing the rim upon the wheel. As shown, 42 is the wooden felly of the wheel, 43 being the metallic felly band shrunk thereon. This felly band has an upwardly and outwardly extending flange 44 formed at one edge thereof, the periphery of this flange forming a rounded bearing surface 45. The other edge of the felly band is curved outwardly and downwardly to provide a convex rounded bearing surface 46. If the channel 5 at the side of the tire-carrying rim is made wide, as above described, the angle between the inner wall 6 and the bottom 7 of the channel is preferably rounded and forms a convex bearing surface 47 which engages the bearing surface 46 on the felly band. A second bearing surface 48 is formed on the under-side of the tire-carrying rim, this surface being preferably formed by rolling a shallow depression 49 in the rim base. The bearing surfaces 45 and 48 are of greater diameter than the bearing surfaces 46 and 47 at the opposite side of the wheel, this difference of diameter facilitating the application of the rim to the wheel and permitting the same to be freely operated with a less clearance between the wheel and rim than would be required if the bearing surfaces at the two sides of the wheel were of the same diameter. For causing the complementary bearing surfaces upon the wheel and rim to be brought into engagement, the rim may be moved laterally on the wheel by any suitable means, although I prefer to force it radially away from the wheel periphery at intervals in order to draw the bearing surfaces of the rim upon the bearing surfaces of the wheel between the points where the rim is forced away from the wheel periphery. For this purpose I provide a plurality of spaced studs 50 extending radially through the wheel felly, these studs having conical or tapered ends 51 entering sockets 52 formed in the rim base, the studs having threaded stems 53 which screw through plates 54 secured inside of the wheel felly in any suitable manner, as by means of rivets 55 passing through the felly and felly band. The ends of the stems 53 of the studs are preferably squared as indicated at 56, or otherwise suitably shaped for engagement by a wrench or tool for rotating the same. Lock-nuts 57 may be mounted upon the stems 53 of the studs, if desired, these nuts serving to limit the outward movement of the studs and also to hold the same against working loose.

The idea of using means such as radial studs for forcing a rim outward at intervals to cause the same to grip the wheel between the points where it is forced out is fully described by me and claimed broadly in certain applications which I have already filed; for example, my applications Serial Number 668,771, filed December 30, 1911, and Serial Number 672,544 filed January 22, 1912, and no broad claims to this feature of construction are therefore made in the present case.

In Figs. 4 and 5 I have illustrated an improved form of tool or wrench specially adapted for operating the radial studs for securing the rim upon the wheel. It will be seen that the location of these studs is such that they cannot be operated by an ordinary brace wrench such as is commonly used for operating demountable rims, although a wrench of this nature is usually preferred by rim users, as it permits the very rapid operation of the fastening bolts or wedges. My improved tool comprises a brace wrench adapted to be held at an angle to that of the stud to be turned. This is accomplished in the form of my invention illustrated in Figs. 4 and 5 by providing beveled gearing for driving the wrench socket from the revolving brace. As shown in these figures, 60 is the socket member of the wrench, this member having a socket 61 therein adapted to fit the head 56 of the stud, and also having a socket 62 therein for the lock-nut, if the latter is used. The socket member 60 is preferably mounted to rotate in a casing 63 and has teeth formed thereon constituting a beveled gear 64. 65 is the brace portion of the wrench, this being preferably provided with the usual handles 66 and 67. The shaft 68 of the brace is journaled in a bearing sleeve 69 projecting from the casing 63. The end of the shaft has fixed thereto the beveled gear 70 meshing with the beveled gear 64 on the socket member of the wrench. As will be readily understood, the rotation of the brace will drive the gear 70, which drives the gear 64 and consequently rotates the socket member of the wrench, thus screwing or unscrewing the radial stud, depending upon the direction in which the wrench is operated. It will be seen that the socket member of the wrench is supported in rigid relation with the brace part of the wrench, so that the operator in grasping the handles of the latter can hold the socket member of the wrench in engagement with the head of the stud and the lock-nut. The gear 70 may advantageously be made of greater diameter than the gear 64, so as to procure a rapid rotation of the latter and a quick operation of the stud. The cranks 71 of the brace are preferably disposed at a considerable angle to the shaft 68, and the portions of the brace carrying the handles 66 and 67, instead of being substantially at right angles to such portions, as is customary, the brace thus being elongated and shaped in such a way as to be capable of easy operation in proximity to a vehicle wheel.

In Fig. 8 I have illustrated a modified form of tool or wrench for rotating the radial studs, the wrench shown in this figure comprising a socket member 72 having sockets 73 and 74 therein for the reception of the head of the radial stud and the lock-nut, respectively. The socket member 72 is connected to the brace member 75, only a portion of which is shown, by means of a universal joint. This may be of any ordinary construction; for example, the end of the brace may have secured thereto the fork 76, in the arms of which are journaled the trunnions 77 of the block 78. A pin 79 passes through a hole in the block 78, the axis of the pin being at right angles to the axis of the trunnions 77, the ends of the pin 79 being carried by arms 80 projecting from the socket member 72. The socket member 72 preferably has a groove 81 formed in its surface so that it may be conveniently grasped by the operator and held in engagement with the head of the stud, if this is found necessary.

Having thus described certain preferred embodiments of my invention, but without desiring to limit myself to the details set forth any further than as specified in certain of the more limited claims hereunto appended, I claim:

1. A vehicle wheel rim comprising a tire-seating member having a tire-retaining flange at one side thereof, and locking portions formed in the opposite side thereof, one of said locking portions consisting of an irregularly shaped opening for receiving an engaging member of a split tire-retaining flange and the other of said locking portions comprising a slot for receiving an engaging member of a split locking ring.

2. A vehicle wheel rim comprising a base portion having a tire-retaining flange at one side thereof and a channel at the other side, a locking portion in said channel consisting of an irregularly shaped opening for receiving an engaging member of a split tire-retaining flange, and a second opening having an offset portion adapted to engage a split locking ring.

3. A vehicle wheel rim comprising a tire-seating member having a tire-retaining flange at one side thereof and a channel at the other side provided with slots adapted to receive interchangeably a transversely split tire-retaining flange and a transversely split locking ring adapted to hold in position an endless tire-retaining flange, one of said slots extending inwardly from the edge of the rim, the edge of the slot constituting part of the rim edge.

4. A vehicle wheel rim comprising a tire-seating member having a tire-retaining flange at one side thereof and a channel at the other side adapted to receive interchangeably a transversely split tire-retaining flange, and an endless tire-retaining flange adapted to be held in position by a transversely split locking ring, said channel being wider than either said transversely split flange or said locking ring.

5. In a vehicle wheel rim, a tire-seating member having a channel at one side thereof adapted to receive a tire-retaining flange and a locking ring, the edge of the outer wall of said channel being of sufficiently less diameter than the diameter of the tire-seating surface of the tire-seating member to permit the seating thereon of the tire-retaining flange and the locking ring.

6. In a vehicle wheel rim, the combination of a tire-seating member having a channel formed at one side thereof adapted to receive a tire-retaining flange and a locking ring, and a transversely split tire-retaining flange having a base portion adapted to be seated in said channel, said flange having a shoulder adapted to engage the edge of the outer wall of said channel, the diameter of the edge of the outer wall of said channel being sufficiently less than that of the tire-seating surface of said tire-seating member to permit the seating thereon of said flange and the locking ring.

7. In a vehicle wheel rim, the combination of a tire-seating member having a channel formed at one side thereof, the diameter of the edge of the outer wall of said channel being less than the diameter of the tire-seating surface of said tire-seating member, an endless reversible tire-retaining flange, the diameter of the inner surface of which is greater than the diameter of the edge of the outer wall of the channel, and a transversely split locking ring for retaining said endless flange upon the tire-seating member of the rim, said locking ring having a base adapted to seat in said channel and having an extension portion extending from said base between the edge of the outer wall of the channel and the inner surface of the flange for a major portion of its width, said extension carrying an upwardly projecting flange engaging the side of said endless tire-retaining flange in either its normal or reverse position and retaining the same against outward movement.

8. In a vehicle wheel rim, the combination of a tire-seating member having a channel at one side thereof, an endless reversible tire-retaining flange having a clencher groove in one side thereof and having a convex annular bearing surface at the other side thereof adapted to engage a straight-sided tire, and having an annular groove formed below said convex bearing surface, the lower wall of said groove having an inclination equal but opposite to that of the surface of the lower portion of the opposite side of the flange, and a transversely split locking ring for securing said flange upon said tire-seating member, said ring having a base adapted to seat in said channel, and an inwardly inclined flange adapted to engage the inclined surface upon the exposed side of said endless tire-retaining flange.

9. A tire-carrying rim having a depressed channel at one side thereof, provided with a slot lying wholly within said channel, and a second slot extending from a point within said channel to the edge of said rim.

10. A tire-carrying rim having a central tire-seating portion and a depressed channel at one side thereof, provided with a slot lying wholly within said channel, and a second slot extending from a point within said channel to the edge of said rim.

11. A demountable rim having at one side of the base thereof an opening of irregular outline adapted to lock a transversely split tire-retaining flange and a second opening of substantially regular outline in the base of said rim circumferentially spaced from the first mentioned portion adapted to engage a transversely split locking ring for an endless tire-retaining flange.

12. A demountable rim having at one side a depressed groove with an offset slot therein, and with a second slot formed in the outer wall of said groove, the former adapted to engage a split tire-retaining flange, and the latter adapted to engage a split locking ring for an endless tire-retaining flange.

13. A demountable rim for resilient tires comprising a base portion, a tire-engaging flange at one side and an off-set depressed flange at the other side adapted to receive and retain successively a split tire-engaging flange and a split locking ring for an endless tire-engaging flange.

14. A demountable rim for resilient tires comprising a base portion, means for retaining a transversely split tire-retaining flange comprising a slot in said base portion having an offset part and a notch in the base portion extending from the edge of the rim inwardly, said slot and said notch serving to hold interchangeably a split tire-retaining flange and a split locking ring for an endless tire-retaining flange.

15. A demountable rim having at one side, spaced from the edge of said rim, engaging means comprising an offset slot, and at the edge of said rim adjacent the first-mentioned slot a second engaging means comprising a slot, the first-mentioned slot being adapted to engage a split tire-retaining flange and the second-mentioned slot being adapted to engage a split locking ring for an endless tire-retaining flange.

JAMES H. WAGENHORST.

Witnesses:
SEWARD DAVIS,
EDMUND QUINCY MOSES.